2,998,357
RECOVERY OF ALKYLAMINES

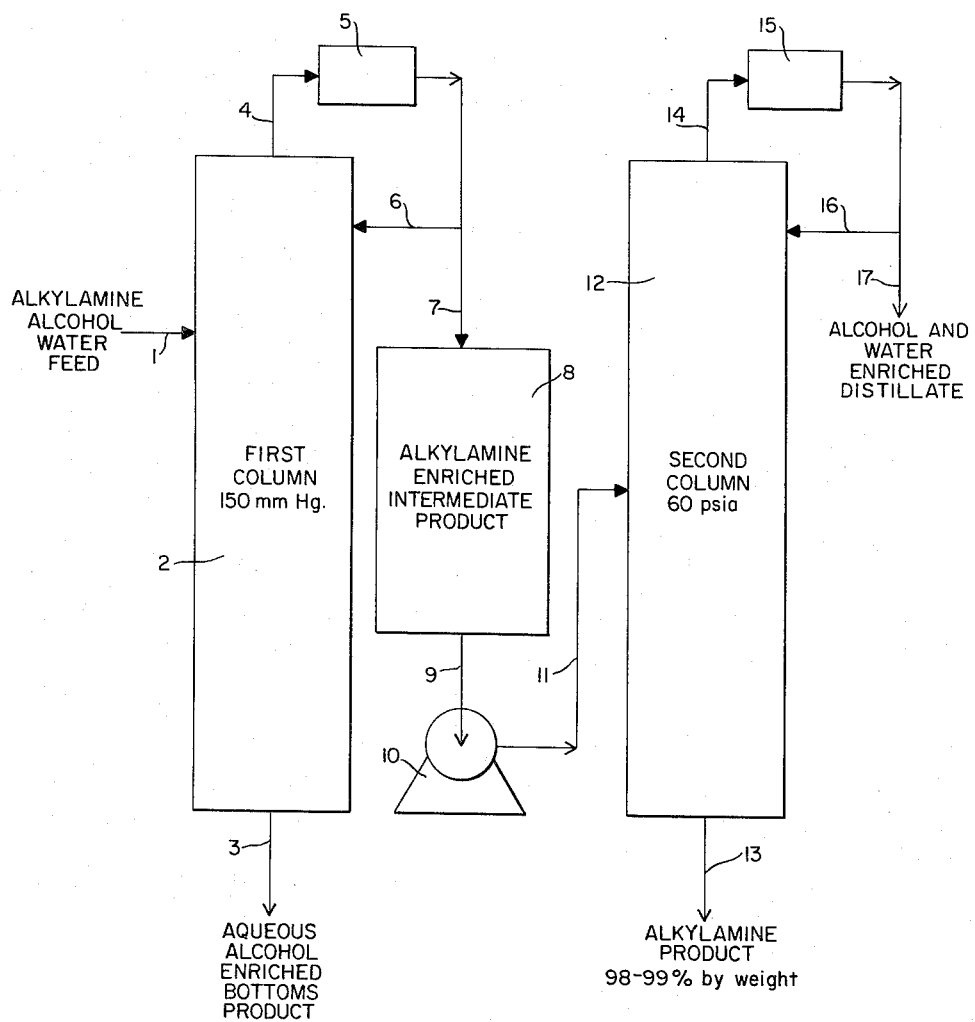

Leslie A. Gillette, Trenton, and Le Roy Martin, Wyandotte, Mich., assignors to Pennsalt Chemicals Corporation, Philadelphia, Pa., a corporation of Pennsylvania
Filed Jan. 20, 1959, Ser. No. 787,817
8 Claims. (Cl. 202—51)

This invention relates to recovery of an alkylamine in alcohol-free, anhydrous form from a mixture containing said alkylamine, alcohol and water. Particularly, it relates to a method for the separation of diisopropylamine from admixture with aqueous isopropanol and of triethylamine from admixture with aqueous ethanol.

The crude alkylamine product to which the process of this invention is applied is obtained from the synthesis of diisopropylamine or triethylamine. The production of said alkylamines is typified by the reaction of the corresponding alcohol with ammonia over a dehydrating or hydrogenating catalyst, or by the reaction of dialkylamine with an alcohol, or by the reaction of an alkylamine with aldehyde or a ketone. In each of these reactions, there is formed a mixture consisting of alkylamines, unreacted alkylating agent, ammonia and water.

In the recovery of the alkylamine from the reaction mass, separation of ammonia and lower-boiling alkylamines, i.e., those boiling below about 60° C., from the higher-boiling components in the product mixture is accomplished by distillation without difficulty because of the wide spread between the respective boiling points. However, separation of the higher-boiling alkylamine product from the remaining product mixture is a physically difficult problem because of the azeotropes which are formed. For example, in the recovery of diisopropylamine, after the removal of ammonia and isopropylamine by distillation from the reaction product mixture, there remains a mixture consisting of diisopropylamine (B.P. 83.86° C.), isopropyl alcohol (B.P. 82.3° C.), and water. Distillation of this mixture results in the formation of an azeotropic mixture of the alkylamine and water boiling at 74.6° C. at 760 mm. pressure and containing about 90% diisopropylamine. As the water in the boiling liquid diminishes, a ternary mixture of diisopropylamine-isopropanol-water distills from the system. When the water has all been distilled off, a binary azeotrope of diisopropylamine and isopropanol containing about 64% diisopropylamine distills over at 80° C. at 760 mm. pressure.

Similarly, in the distillation of the system triethylamine-ethanol-water, one recovers first a ternary azeotrope containing about 78.3% triethylamine, 11.1% ethanol and 10.6% water, which boils at about 75° C., and then either a triethylamine-water azeotrope containing about 90% triethylamine and boiling at about 76.3° C., or a triethylamine-ethanol azeotrope containing about 47.0% triethylamine and boiling at about 77.4° C., depending on the original composition of the charge to the still.

The problem of recovering high purity triethylamine and diisopropylamine from their respective crude product mixtures has received considerable attention in the art, especially as both amines have grown in commercial importance. Various separation procedures have been devised by prior art workers, as discussed in the patents below. Due to the formation of azeotropes, direct distillation has heretofore not been successfully practiced. Common practice is to treat the crude alkylamine product mixtures with water to remove a main portion of the alcohol by washing. The water-saturated oil layer containing the substantially alcohol-free alkylamine is then commonly subjected to various modified distillation procedures to remove residual alcohol and/or the dissolved water from the alkylamine.

In U.S. Patent 2,237,628, triethylamine is recovered from its reaction mixture by washing with hot water. This separation is based upon the differences in solubilities of the components of the mixture in water at elevated temperatures. The wet triethylamine which is recovered must be further processed. In U.S. Patent 2,348,683, diisopropylamine is recovered from admixture with isopropanol by the addition of amounts of water sufficient to form a binary azeotrope with all the diisopropylamine present in the still during distillation. The water subsequently is separated by chemical or physical means from the alkylamine. In U.S. Patent 2,411,802, amine mixtures are separated by mixing the crude reaction mixture with an aqueous solution of alkali metal hydroxides and subsequently separating the amines from the resultant aqueous solution by distillation. In U.S. Patent 2,512,-584, isopropanol is separated from diisopropylamine by adding an inert hydrocarbon to the mixture with water and azeotropically separating the isopropanol from the amine. In U.S. Patent 2,512,585, isopropanol is azeotropically distilled from diisopropylamine by adding an inert organic liquid capable of forming with isopropanol an azeotrope which boils below the boiling point of the inert organic liquid, isopropanol, diisopropylamine and the isopropanol-diisopropylamine azeotrope. In U.S. Patent 2,695,267 a mixture of diisopropylamine, water and isopropanol is distilled in the presence of an added hydrocarbon fraction to recover the diisopropylamine in pure form. In U.S. Patent 2,713,597, a mixture containing diisopropylamine and isopropanol is washed with water at a temperature between 28° C. and 78° C. whereupon isopropanol separates from diisopropylamine and the separated washed oil layer is subjected to multiple distillations to recover anhydrous diisopropylamine.

It can be seen from the above patents that considerable attention has been given to the problem of separating the alkylamines from their respective mixtures. It is apparent also that multiple washings and distillations are involved which are wasteful of both time and energy and which can result in lowered yield of product due to the rehandling of the alkylamine product-containing liquid layer and in possible contamination from added azeotrope-shifting materials.

We now have discovered an improved process for recovering pure diisopropylamine from admixture with isopropanol and water and for the recovery of pure triethylamine from admixture with ethanol and water. We have observed that carrying out the distillation of such crude alkylamine mixtures at a pressure below atmospheric pressure results in an increase of the alkylamine in the alkylamine-water azeotrope overhead product, leaving as a bottoms product an alcohol residue which is leaner in alkylamine. We have also observed that by carrying out the distillation of said mixtures at a pressure above atmospheric pressure a ternary mixture of alkylamine, alcohol and water is recovered in the overhead product, which becomes progressively enriched in alcohol and water as the pressure is increased while the bottoms product becomes correspondingly enriched in the desired alkylamine. Combining these observations, we have subjected reaction mixtures containing diisopropylamine, isopropanol, and water (and similarly, mixtures of triethylamine, ethanol, and water) to distillation first at a sub-atmospheric pressure whereby the alkylamine is concentrated in a distillate consisting principally of the alkylamine and water and then transferred said distillate to a pressurized distillation column whereby the alkylamine is concentrated and removed as an alcohol-and-water-free bottoms product of commercial quality.

Our process has the important economic advantages of eliminating the need for scrubbers, additions of water or azeotrope-shifting distillation liquide and/or dehydrating chemicals. Also, losses of alkylamine from excessive handling are minimized. Furthermore, continuous processing is facilitated, and direct production of commercially pure alkylamine is simplified and enhanced.

The vapor-liquid characteristics of the two systems with which the invention is concerned, and the effects of pressure upon them, are shown in the immediately following paragraphs. Comparative vapor-liquid data of some diisopropylamine-isopropanol-water systems are shown in Table I. Similar data for some triethylamine-ethanol-water systems are shown in Table II.

TABLE I

Diisopropylamine-isopropanol-water

Vapor-Liquid Equilibrium

| Component | Phase | Composition, Percent by Weight | | |
|---|---|---|---|---|
| | | Run 1 | Run 2 | Run 3 |
| Diisopropylamine | Liquid | 40.1 | 50.1 | 85.2 |
| Isopropanol | do | 45.3 | 30.0 | 10.3 |
| Water | do | 14.6 | 19.9 | 4.5 |
| Diisopropylamine | Vapor [1] | 52.1 | 64.2 | 83.2 |
| Isopropanol | do | 36.4 | 23.8 | 7.5 |
| Water | do | 11.5 | 12.0 | 9.3 |
| Vapor Temperature, °C./760 mm | | 78.2 | 77.2 | 75.6 |

[1] Composition at head of one plate Othmer still.

TABLE II

Triethylamine-ethanol-water

| Component | Phase | Composition, Percent by Weight | | |
|---|---|---|---|---|
| | | Run 1 | Run 2 | Run 3 |
| Triethylamine | Liquid | 40.3 | 50.5 | 85.2 |
| Ethanol | do | 49.5 | 33.6 | 10.0 |
| Water | do | 10.2 | 15.6 | 4.8 |
| Triethylamine | Vapor [1] | 78.4 | 75.3 | 82.6 |
| Ethanol | do | 10.6 | 10.6 | 10.2 |
| Water | do | 11.0 | 14.1 | 7.2 |
| Vapor Temperature, °C./760 mm | | 75.2 | 75.4 | 75.3 |

[1] Composition at head of one plate Othmer still.

The similarity between the vapor-liquid compositions and boiling points of the two alkylamine-alcohol-water systems at higher concentrations is apparent from a comparison of run number three in the two tables. This similarity is a factory which makes the method of our invention equally applicable to both systems.

The effect of pressure on the vapor composition of the alkylamine-alcohol-water system is shown in (a) Table III, Diisopropylamine-isopropanol-water system, and in (b) Table IV, Triethylamine-ethanol-water system. The data in each case were obtained by distilling a synthetic mixture of crude alkylamine through an 18 theoretical plate laboratory column. In each table, it is to be noted that the vapor composition is progressively richer in alkylamine at an absolute pressure below 760 mm. mercury, and is progressively poorer in alkylamine at pressures above 760 mm.

TABLE III

Diisopropylamine-isopropanol-water system

Pressure versus vapor composition

| Pressure, mm. | Temp., °C. | Vapor Composition, Percent by Weight | | |
|---|---|---|---|---|
| | | Diisopropylamine | Isopropanol | Water |
| 155 | 37.7 | 94.6 | 0.0 | 5.4 |
| 445 | 60.8 | 91.0 | 0.0 | 9.0 |
| 760 | 74.6 | 90.0 | 0.0 | 10.0 |
| 1,650 | 97.3 | 75.0 | 9.0 | 16.0 |
| 2,862 | 115.4 | 60.0 | 25.0 | 15.0 |

NOTE.—Composition of liquid charged to still, all percents by weight: 55% diisopropylamine; 30% isopropanol; and 15% water.

TABLE IV

Triethylamine-ethanol-water system

Pressure versus vapor composition

| Pressure, mm. | Temp., °C. | Vapor Pressure Composition, Percent by Weight | | |
|---|---|---|---|---|
| | | Triethylamine | Ethanol | Water |
| 150 | 34.6 | 92.0 | 7.4 | 0.6 |
| 200 | 41.0 | 89.1 | 7.5 | 3.3 |
| 300 | 52.0 | 84.3 | 8.6 | 7.1 |
| 760 | 76.3 | 78.3 | 11.1 | 10.6 |
| 1,613 | 96.7 | 71.5 | 17.2 | 11.3 |
| 3,000 | 116.0 | 66.6 | 20.4 | 13.1 |

NOTE.—Composition of liquid charged to still for distillations made at 150-760 mm. pressure, all percents by weight; 12.0% triethylamine; 46.6% ethanol; and 41.4% water. Composition of liquid used for distillations at 1613 and 3000 mm. pressure: 76.3% triethylamine; 11.1% ethanol; and 10.6% water.

In a preferred embodiment of our invention, crude alkylamine, i.e., product mixture from an alkylamine synthesis process, previously substantially stripped of ammonia and other lower boiling constituents, is charged continuously at an appropriate theoretical plate level (determinable from the molar composition of the crude alkylamine feed mixture), e.g., about the fifth plate from the bottom, into a distillation column having a height at least equivalent to about seven theoretical plates and operating at a vacuum of about 150 mm. mercury with a bottoms temperature sufficient to maintain a satisfactory reflux and distillate take-off rate without flooding the column. Substantially alkylamine-free alcohol is recovered as a bottoms product from the still. The distillate from the above column is then charged continuously at an appropriate theoretical plate level, e.g., about two-thirds from the top, into a distillation column having a height at least equivalent to about four theoretical plates and operating at a pressure of about 60 p.s.i.a. (pounds per square inch absolute) with a bottoms temperature substantially determined by the boiling point of the pure alkylamine and adequate to remove water and residual alcohol as a distillate. The alkylamine is recovered as a substantially anhydrous, alcohol-free bottoms product of commercial grade purity.

The process of this invention may be carried out batchwise as well as continuously, but continuous operation of the process is preferred.

The invention is illustrated by the accompanying drawing of a flow diagram showing the essential features of such a preferred embodiment of the invention.

According to the drawing, a feed mixture of alkylamine, alcohol and water is charged continuously through supply line 1 to the upper section of a first fractionating column 2. The column 2 is operated at subatmospheric pressure, e.g. 150 mm. Hg, and under conditions of reflux and temperature such that the composition leaving the column 2 through discharge line 3 is substantially enriched in alcohol and water. The overhead product, enriched in alkylamine and containing minor amounts of alcohol and water, passes through outlet line 4 to a heat exchanger 5. Part of the product condensate from heat exchanger 5 is recycled to column 2 through line 6 and the remainder is charged continuously through line 7, as alkylamine-enriched intermediate product, to a holding tank 8 from which it is charged through line 9 to pump 10 and pumped through line 11 to a second fractionating column 12, which is operated at superatmospheric pressure, e.g. 60 p.s.i.a. Conditions of reflux and temperature are maintained in column 12 such that the composition of the product leaving column 12 through discharge line 13 is about 98–99% alkylamine by wieght. The overhead distillate product, enriched in alcohol and water, passes through outlet line 14 to a heat exchanger 15. Part of the overhead condensate from the heat exchanger 15 is returned as reflux to column 12 through line 16 and the remainder is discharged via line 17.

The composition of the crude mixture charged to the sub-atmospheric still will, of course, depend on the particular process used in manufacturing the particular alkylamine and upon the subsequent pre-treatment of the mixture, e.g., the amount and method of stripping out of the ammonia, unreacted alkylates and lower alkylamines and compositing of crude mixtures from various runs and still cuts. However, a stripped, crude mixture composition may be expected to contain from about 10–90% by weight of alkylamine, about 5–90% of water, and about 5–90% alcohol. A particularly advantageous mixture for treatment by my process contains 10–60% alkylamine, 15–50% alcohol and 15–50% water (all percents by weight).

The sub-atmospheric distillation of the crude alkylamine-containing mixture is carried out at a vacuum at least below about 600 mm. mercury. A practical working vacuum range is 25–600 mm. mercury. However, any reduction of the vapor pressure in the still below atmospheric is advantageous and may be used. When a crude mixture of diisopropylamine is subjected to the sub-atmospheric distillation, a pressure of 100–200 mm. mercury is preferably used. Similarly in the case of triethylamine a pressure of 100–200 mm. mercury is preferably used. In either case, however, about 150 mm. mercury vacuum is especially preferred.

The super-atmospheric distillation of the alkylamine-water azeotrope is carried out at a pressure of at least about 30 p.s.i.a. Any amount of pressure below the critical pressure of the components is advantageous for the successful practice of the invention. A practical working pressure range is 30–150 p.s.i.a., and a preferred pressure is 60 p.s.i.a. These pressure conditions apply equally to the diisopropylamine-isopropanol-water mixture and to the triethylamine-ethanol-water mixture.

The invention and its practice are further illustrated by the following examples, in which the percentages are by weight unless otherwise stated.

EXAMPLE 1

A mixture consisting of about 20% triethylamine, 40% water and 40% ethanol is charged continuously to about the fifth plate (measured from the bottom) of a seven theoretical plate fractionation column operating at a vacuum of about 150 mm. mercury, a still bottoms temperature of 60° C., and a distillate take-off temperature of about 50° C. A still bottoms product is obtained analyzing about 85% by weight ethanol with the remainder being water substantially free of triethylamine. A distillate is recovered which analyzes about 82% triethylamine, 8% water and 10% ethyl alcohol. The distillate is continuously charged to about the third plate of a four theoretical plate pressurized fractionation column operating at a pressure of about 60 p.s.i.a., a still bottoms temperature of about 140° C., and a distillate take-off temperature of about 115° C. A bottoms product is recovered which analyzes about 99% by weight triethylamine. The distillate is a mixture of ethyl alcohol and water substantially free of triethylamine.

EXAMPLE 2

A mixture consisting of about 40% diisopropylamine, 35% isopropanol, and 25% water is continuously charged to about the fifth plate of a seven theoretical plate fractionation column operating at vacuum of about 150 mm. mercury, a still bottoms temperature of 64° C. and a distillate take-off temperature of about 50° C. A still bottoms product analyzing about 85% isopropanol with the remainder being water substantially free of diisopropylamine is recovered. A distillate is recovered which analyzes about 85% diisopropylamine, 7% water and 8% isopropanol. The distillate is charged continuously to about the second plate of a four theoretical plate pressurized fractionation column operating at a pressure of about 60 p.s.i.a., a still bottoms temperature of about 135° C., and a distillate take-off temperature of about 115° C. A still bottoms product is recovered which analyzes about 98% diisopropylamine. The distillate is a mixture of isopropanol and water substantially free of diisopropylamine.

Many widely different embodiments of this invention may be made and many process variables obvious to those skilled in the art may be introduced without departing from the scope and spirit thereof and it is to be understood that our invention includes all such embodiments and is not to be limited by the above description.

We claim:

1. In the separation of an alkylamine selected from the group consisting of diisopropylamine and triethylamine from a mixture containing said alkylamine, its corresponding alcohol and water, the process which comprises distilling said mixture at subatmospheric pressure, recovering an overhead product richer in said alkylamine than the mixture charged, then distilling said alkylamine product at superatmospheric pressure, thereby recovering said alkylamine as a substantially anhydrous and alcohol-free bottoms product.

2. The process according to claim 1 wherein said alkylamine is diisopropylamine.

3. The process according to claim 1 wherein said alkylamine is triethylamine.

4. The process according to claim wherein said subatmospheric pressure is at most about 600 mm. mercury.

5. The process according to claim 1 wherein said subatmospheric pressure is from 25 mm. to about 600 mm. mercury.

6. The process according to claim 1 wherein said superatmospheric pressure is at least about 30 p.s.i.a.

7. The process according to claim 1 wherein said superatmospheric pressure is from 30 to about 150 p.s.i.a.

8. The process according to claim 1 wherein said subatmospheric pressure is about 150 mm. mercury and said superatmospheric pressure is about 60 p.s.i.a.

References Cited in the file of this patent

UNITED STATES PATENTS

| | | |
|---|---|---|
| 2,049,486 | Babcock | Aug. 4, 1936 |
| 2,324,255 | Britton et al. | July 13, 1943 |
| 2,348,683 | McKenna | Mar. 9, 1944 |
| 2,381,876 | Carlson | Aug. 14, 1945 |
| 2,846,376 | McCormick et al. | Aug. 5, 1958 |

OTHER REFERENCES

Horsley: "Azeotropic Data," published by American Chemical Society, 1952, Washington, D.C. (Copy in Div. 38.)

UNITED STATES PATENT OFFICE

CERTIFICATE OF CORRECTION

Patent No. 2,998,357                                    August 29, 1961

Leslie A. Gillette et al.

It is hereby certified that error appears in the above numbered patent requiring correction and that the said Letters Patent should read as corrected below.

Column 6, line 48, after "claim" insert -- 1 --.

Signed and sealed this 16th day of January 1962.

(SEAL)
Attest:

ERNEST W. SWIDER                                      DAVID L. LADD
Attesting Officer                                          Commissioner of Patents